United States Patent
Lieblich et al.

(10) Patent No.: US 7,865,958 B2
(45) Date of Patent: *Jan. 4, 2011

(54) END USER RISK MANAGEMENT

(75) Inventors: Jason Lieblich, Hollis, NH (US); Dustin Norman, Nashua, NH (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 66 days.

This patent is subject to a terminal disclaimer.

(21) Appl. No.: 12/366,150

(22) Filed: Feb. 5, 2009

(65) Prior Publication Data

US 2009/0178142 A1 Jul. 9, 2009

Related U.S. Application Data

(63) Continuation of application No. 10/894,714, filed on Jul. 20, 2004, now Pat. No. 7,490,356.

(51) Int. Cl.
*G06F 11/00* (2006.01)
(52) U.S. Cl. .................... 726/25; 726/23; 713/182; 708/135
(58) Field of Classification Search .............. 726/25, 726/23, 26, 27, 29, 30, 28; 455/26.1; 399/366; 379/93.02; 708/135

See application file for complete search history.

(56) References Cited

U.S. PATENT DOCUMENTS

| | | | |
|---|---|---|---|
| 6,219,805 B1 | 4/2001 | Jones et al. | |
| 6,405,318 B1 | 6/2002 | Rowland | |
| 6,470,319 B1 | 10/2002 | Ryan | |
| 6,546,493 B1 | 4/2003 | Magdych et al. | |
| 6,553,377 B1 | 4/2003 | Eschelbeck et al. | |
| 6,553,378 B1 | 4/2003 | Eschelbeck | |
| 6,912,502 B1 * | 6/2005 | Buddle et al. ............ 705/10 |
| 6,941,467 B2 | 9/2005 | Judge et al. | |
| 7,089,590 B2 | 8/2006 | Judge et al. | |
| 7,096,498 B2 | 8/2006 | Judge | |
| 7,124,438 B2 | 10/2006 | Judge et al. | |
| 7,136,860 B2 | 11/2006 | Doliov | |
| 7,146,642 B1 | 12/2006 | Magdych et al. | |
| 7,237,264 B1 | 6/2007 | Graham et al. | |
| 7,269,757 B2 | 9/2007 | Lieblich et al. | |
| 2002/0062449 A1 | 5/2002 | Perna et al. | |
| 2002/0147803 A1 | 10/2002 | Dodd et al. | |
| 2003/0028803 A1 | 2/2003 | Bunker et al. | |

(Continued)

OTHER PUBLICATIONS

International Search Report for PCT/US2005/022352 filed Jun. 23, 2005.

(Continued)

*Primary Examiner*—Kimyen Vu
*Assistant Examiner*—April Y Shan
(74) *Attorney, Agent, or Firm*—Foley and Lardner LLP; Christopher McKenna

(57) ABSTRACT

A flexible, efficient and easy-to-use computer security management system effectively evaluates and responds to informational risks on a wide variety of computing platforms and in a rapidly changing network environment. An individual computer system dynamically monitors its end user, without regard to network connectivity, in order to calculate a risk score and to ensure that the end user's behavior does not put corporate information or other assets at risk. Data regarding such risks and responses are analyzed and stored in real-time.

16 Claims, 7 Drawing Sheets

U.S. PATENT DOCUMENTS

| | | |
|---|---|---|
| 2003/0154393 A1 | 8/2003 | Young |
| 2003/0200142 A1 | 10/2003 | Hicks et al. |
| 2003/0229808 A1 | 12/2003 | Heintz et al. |
| 2004/0034794 A1 | 2/2004 | Mayer et al. |
| 2004/0073810 A1 | 4/2004 | Dettinger et al. |
| 2004/0230453 A1 | 11/2004 | Belmore |
| 2005/0267827 A1 | 12/2005 | Grant, Jr. et al. |
| 2008/0052231 A1 | 2/2008 | Moscal et al. |

OTHER PUBLICATIONS

Written Opinion for PCT/US2005/022352 filed Jun. 23, 2005.

Reflectent Unveils EdgeSight 3.0 IT to reduce risks of software changes; Proactive Analysis and Problem Diagnosis for Improved Reliability Business Wire, Apr. 14, 2004, U.S. Appl. No. 10/894,714 Non-Final Office Action, Oct. 9, 2007.

U.S. Appl. No. 10/894,714 Final Office Action, Apr. 17, 2008.

\* cited by examiner

END USER RISK MANAGEMENT

CROSS-REFERENCE TO RELATED CASES

This is related to commonly-assigned pending U.S. patent application Ser. Nos. 10/618,092 (filed Jul. 11, 2003) and 10/626,394 (filed Jul. 24, 2003), both entitled "DISTRIBUTED COMPUTER MONITORING SYSTEM AND METHODS FOR AUTONOMOUS COMPUTER MANAGEMENT", the full disclosures of which are incorporated herein by reference.

FIELD OF THE INVENTION

The invention relates to computer security and, more specifically, facilitating increased security of confidential information on a variety of computer systems.

BACKGROUND OF THE INVENTION

As corporations have grown, their computer needs and the corresponding computational infrastructures have increased in both size and complexity. Thousands or tens-of-thousands of computers may be connected to each other, even within a single organization. Numerous computer users, or end users, may have access to each computer. At any given time, each computer may be connected to or disconnected from a corporate intranet, the Internet, or another communications network. In addition, through the various networked computers, each end user may have access to sensitive, important and valuable corporate information. Information Technology managers are often tasked with preventing disclosure of this information to unauthorized individuals while simultaneously facilitating ubiquitous access to the same information by authorized individuals. While satisfying these difficult and often competing goals for a few end users is challenging, the problem increases exponentially as the number of end users grows.

In a typical corporate environment, several host computer systems are interconnected internally over an intranet to which individual workstations and other network resources are connected. These intranets, also known as local area networks (LANs), make legacy databases and information resources widely available for access and utilization throughout the organization. These same corporate resources also can be connected directly, or through wide area networks (WANs), to remote computational resources located throughout the Internet. By way of the Internet, external end users can be given restricted access to select corporate resources, such as a corporate website, for the purpose of completing limited transactions or data transfer.

Most current networks are based on the Transmission Control Protocol/Internet Protocol (TCP/IP) suite, such as that described in W. R. Stevens, "TCP/IP Illustrated," Vol. 1, Ch. 1, Addison-Wesley (1994). Computer systems and network devices employing the TCP/IP suite implement a network protocol stack, which includes a hierarchically structured set of protocol layers. In addition, other networking protocols and various network mediums have been implemented globally, creating a diverse and vibrant virtual universe.

The growth of distributed computing environments, especially those connected to the Internet, has created an increased need for computer security, particularly for protecting operating system and application software and stored data. Typically, a wide range of security applications and techniques are employed to ensure effective security. For example, firewalls and intrusion detection systems are necessary to combat would-be network intruders, the so-called "hackers" of the networking world. Similarly, antivirus scanning applications must be regularly executed and, equally importantly, updated, to detect and eradicate computer viruses, Trojan horses, and other forms of unauthorized content. Together, firewalls, intrusion detection systems, antivirus applications, and the like create a formidable array of reactive security applications.

In addition to these reactive security applications, dynamic security applications are increasingly being employed to combat external attacks. For example, vulnerability scanners probe and identify potential security risks and concerns within a company's network. Likewise, "honey pot" or decoy host systems create the illusion of a network of enticing, relatively unguarded, virtual hosts within which a would-be hacker can be tracked, traced, and identified.

While dynamic and reactive security applications form a powerful arsenal of defensive and offensive security tools, installing, configuring, and maintaining security applications, particularly on remote client systems, can be complex and time-consuming. Generic security management applications generally fail due to variations in installed hardware, operating system type and patch level, and application sets and version levels for each client system. Consequently, each client system must be individually evaluated before any changes are effected, a task which only adds more time to an already tedious process.

In addition to employing security applications, an organization will often implement security policies to maximize the effectiveness of the security applications in place. One security policy might require that individual client passwords be changed every month, or that they be established according to predetermined security guidelines. Another security policy might mandate that sensitive documents be password protected or encrypted. Access to secured information may also be restricted to include only highly trusted individuals.

Even within a given site, security policies may vary significantly and require different settings depending upon the platform and organizational needs. A uniform security policy might cause too much inconvenience to employees with limited informational access, while simultaneously leaving high-level executives' extremely sensitive information relatively unguarded. Furthermore, typical security policies, once established, do not provide any mechanism for automatic self-configuration. In essence, they follow a "one size fits all" approach.

Often, the time required to properly configure and maintain a network site grows dramatically with each installed platform. As networks expand, the problem of tracking and securing sensitive information, limiting external vulnerabilities, and providing universal informational access to authorized individuals can quickly overwhelm even the most sophisticated Information Technology department.

Finally, as use of the networked universe and the applications which leverage the network has grown, so too has each end user's responsibility for ensuring security. With growing network utilization, applications have become more complex and often overwhelm even experienced end users. These end users may inadvertently expose the networks and corporate intellectual property to security risks without knowing that they are doing so. Also, the growing complexity of computer systems may allow end users with malicious intent to more easily hide their efforts.

SUMMARY OF THE INVENTION

Thus, a need exists for a flexible, efficient, easy-to-use, real-time security management system that can effectively evaluate and respond to informational risks on a wide variety of computing platforms and in a rapidly changing network environment. Also needed is a solution where an individual computer system can dynamically monitor its end user, whether connected to the network or not, in order to ensure that the end user's behavior does not put corporate information or other assets at risk. Further needed is the ability to analyze and store data regarding such risks and responses in real-time.

The invention generally addresses and satisfies these needs, particularly by monitoring and managing the interactions of end users with their respective computer systems and applications, and determining an appropriate risk score and response for each end user depending on these interactions.

In accordance with one aspect of the invention, a method is provided for evaluating the risk which an end user poses to electronically available information. The steps of the method include: assessing asset values for each piece of electronically available information to which the end user has access, monitoring the end user's interactions with a computer through which the end user accesses the electronically available information, and determining a risk score for the end user based upon the asset values and the monitored interactions, the risk score indicative of the risk that the end user poses to the electronically available information. The risk score can be used to ascertain the risk that the end user poses to the electronically available information and to restrict access to the electronically available information in the event that the end user's risk score exceeds a predetermined threshold.

In accordance with another aspect of the invention, an end user risk management system is provided. The system includes a computer system and a database configured to record two or more data elements, each of the data elements comprising information regarding an end user's interactions with the computer. The system further includes a security agent executing on the computer, wherein the agent is configured to compare a first data element and a second data element in order to determine a risk score for the end user based upon the comparison. Each data element may include transitory information describing the end user's interactions with the computer or with applications executing on the computer system. In this system, the risk score is indicative of the risk that the end user poses to electronically available information accessible by the end user.

In accordance with yet another aspect of the invention, a method of end user risk management is provided. The steps of the method include recording in a computer database two or more data elements, each of the data elements comprising information regarding an end user's interactions with the computer. Thereafter, a first security agent compares a first data element and a second data element in order to determine a risk score for the end user based on the comparison. The risk score is indicative of the risk that the end user poses to electronically available information accessible by the end user. Each data element can comprise transitory information describing the end user's interactions with the computer or with applications executing on the computer.

In accordance with yet another aspect of the invention a method is provided for evaluating the risk which an end user poses to electronically available information. The method includes the steps of: (a) assessing asset values for each piece of electronically available information to which the end user has access; (b) monitoring the end user's interactions with a computer system through which the end user accesses the electronically available information; (c) determining a risk score in real time for the end user based upon the asset values and the end user's interactions, the risk score indicative of the risk that the end user poses to the electronically available information; (d) displaying the risk score to the end user; and (e) while the end user continues to interact with the computer system, returning to step (a).

BRIEF DESCRIPTION OF THE DRAWINGS

These and other aspects of this invention will be readily apparent from the description below and the appended drawings, which are meant to illustrate and not to limit the invention, and in which.

DETAILED DESCRIPTION OF THE PREFERRED EMBODIMENTS

Figure 1:
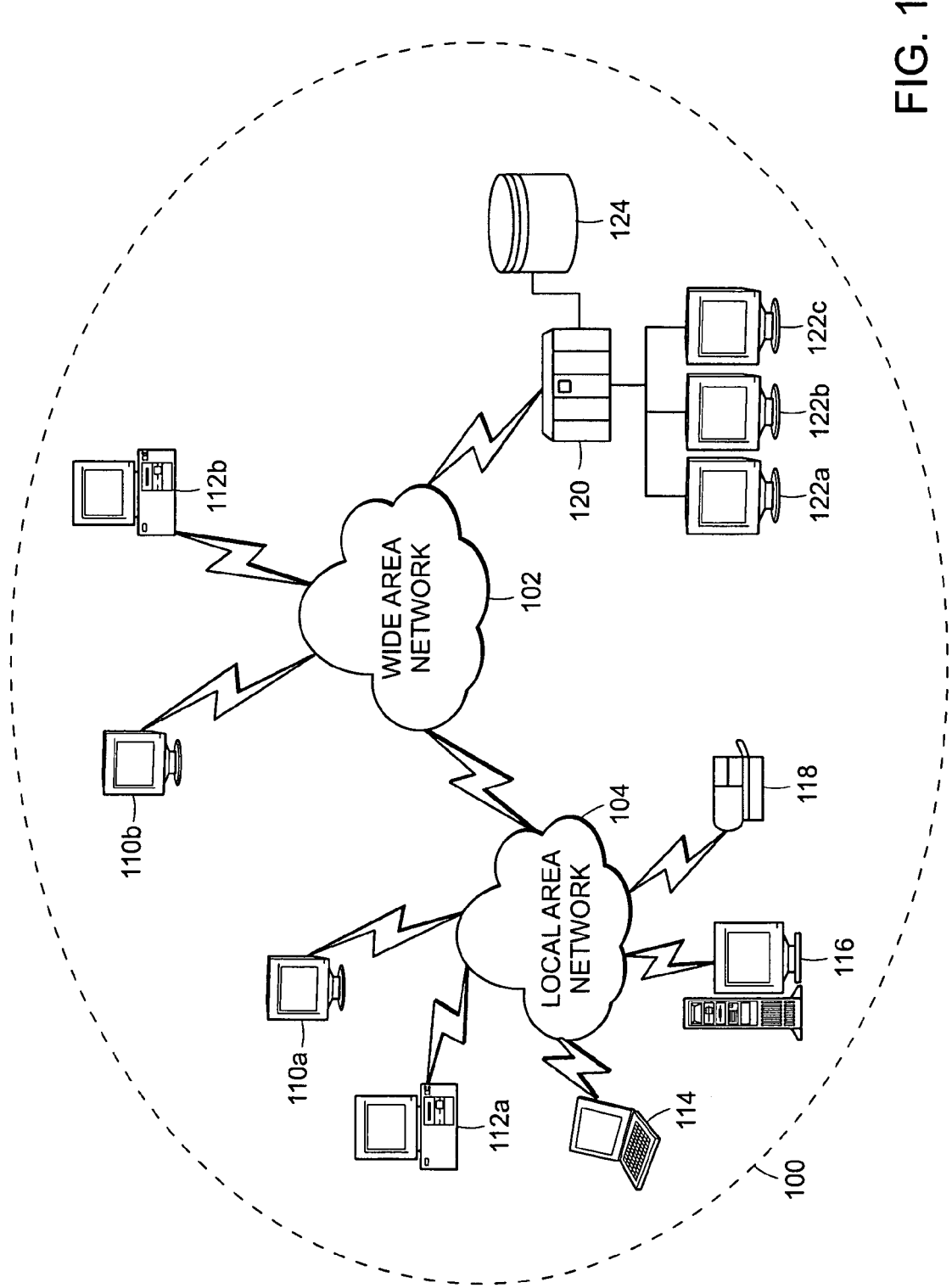
FIG. 1 illustrates a typical enterprise computing environment according to one embodiment of the present invention.

Methods and systems for monitoring and managing the interactions of end users with their respective computers, and for determining an appropriate risk score and response for each end user depending on these interactions, will now be described with respect to certain embodiments according to the invention. The methods and systems described herein are merely exemplary and variations can be made without departing from the spirit and scope of the invention. The present invention will be more completely understood through the following detailed description, which should be read in conjunction with the attached drawings.

In a typical enterprise computing environment, many end users have access to sensitive corporate information through a variety of networked computer systems. These computer systems may include laptop computers, desktop computers, personal digital assistants, and other such devices used by end users either when connected to a network or not. Frequently, the end users make use of their computer systems on a daily basis in order to perform their jobs. For example, sales representatives often share a client database containing information about corporate customers. Similarly, software developers frequently access shared code, with multiple developers accessing various files and libraries. Executives are often privy to the most sensitive and highly confidential corporate information, the disclosure of which could be disastrous for a company. Thus, various end users in any given organization may have access to information or data of varying levels of sensitivity.

As the end users employ their computer systems to access sensitive information, they present risks to that information and, in turn, the company and customers whose confidentiality and privacy must be maintained. These risks include the likelihood that the sensitive information may be disclosed to unauthorized parties, corrupted, lost, or destroyed. The risks may be intentional or inadvertent; the product of a malice or the result of a carelessness. Often, employees may not even know that their interactions with or through their computer systems will put the information at risk. Furthermore, there is typically very little feedback in an organization which would allow employees to recognize the effects their actions have on overall information security. Finally, the feedback is essentially never delivered in real-time to each end user.

The invention addresses these problems, and more, by providing a way to calculate an individual risk score for each end user based upon his or her interactions with his or her computer system and the information to which he or she has access. By monitoring the end user's actions, a system according to the invention can update the risk score in real-time. As the risk score is updated, the system can stop the end user from taking careless or unauthorized risks with the sensitive information. In addition, the system will provide feedback to the end user, allowing him or her to see his or her risk-score, or a variant thereof, in real-time. In some embodiments, the system will even incentivize the end user to modify his or her behavior in order to decrease the total risk to the corporation's sensitive information. The details of such a system are described below.

A. Network Topology.

FIG. 1 illustrates a typical enterprise computing environment 100 according to one embodiment of the present invention. An enterprise computing environment 100 typically comprises a plurality of computer systems which are interconnected through one or more networks. Although only one embodiment is shown in FIG. 1, the enterprise computing environment 100 may comprise a variety of heterogeneous computer systems and networks which are interconnected in a variety of ways and which run a variety of software applications.

One or more local area networks, or LANs, 104 may be included in the enterprise computing environment 100. A LAN 104 is a network that usually spans a relatively short distance. Typically, a LAN 104 is confined to a single building or group of buildings. Each individual computer system or device connected to the LAN 104 preferably has its own Central Processing Unit, or processor, with which it executes programs, and each computer system is also able to access data and devices anywhere on the LAN 104. The LAN 104 thus allows many users to share printers or other devices as well as data stored on one or more file servers 124. The LAN 104 may be characterized by any of a variety of network topologies (i.e., the geometric arrangement of devices on the network), protocols (i.e., the rules and encoding specifications for sending data, and whether the network uses a peer-to-peer or client/server architecture), and media (e.g., twisted-pair wire, coaxial cables, fiber optic cables, radio waves). As illustrated in FIG. 1, the enterprise computing environment 100 includes one LAN 104. However, in alternate embodiments the enterprise computing environment 100 may include a plurality of LANs 104 which are coupled to one another through a wide area network, or WAN 102. A WAN 102 is a network that typically spans a relatively large geographical area, and may connect individual computers or entire LANs which are very far apart.

Each LAN 104 comprises a plurality of interconnected computer systems and other such devices including, for example, one or more workstations 110a, one or more personal computers 112a, one or more laptop or notebook computer systems 114, one or more server computer systems (servers) 116, and one or more smaller hand-held devices (e.g. PDAs or cell-phones). As illustrated in FIG. 1, the LAN 104 comprises one of each of computer systems 110a, 112a, 114, and 116, and one printer 118. The LAN 104 may be coupled to other computer systems, devices or LANs through a WAN 102.

As discussed above, one or more workstations 110a may be a part of the enterprise computing environment 100, either through the LAN 104 or otherwise. Each workstation 110a preferably comprises computer programs stored on a non-volatile memory source (such as a hard drive 220, illustrated in FIG. 2) or accessible to said workstation 110a via the network. Each workstation 110a typically comprises a CPU, such as the Pentium 4® processor by Intel Corporation, with an associated memory media. The memory media stores program instructions of the computer programs, wherein the program instructions are executable by the CPU. The memory media preferably comprises system memory, such as RAM 204, and nonvolatile memory, such as a hard disk 220. In the preferred embodiment, each workstation 110a further comprises a display 208, a keyboard 214 and a mouse 218. The workstation 110a is operable to execute computer programs.

One or more mainframe computer systems 120 may also be part of the enterprise computing environment 100. As shown in FIG. 1, the mainframe 120 is coupled to the enterprise computing environment 100 through the WAN 102, but alternatively one or more mainframes 120 may be coupled through one or more LANs 104. As shown, the mainframe 120 can be coupled to a storage device or file server 124 and mainframe terminals 122a, 122b, and 122c. The mainframe terminals 122a, 122b, and 122c access data stored in the storage device or file server 124 coupled to or comprised in the mainframe computer system 120.

The enterprise computing environment 100 also may have one or more computer systems which are connected through the WAN 102 including, for example, a workstation 110b and a personal computer 112b. In other words, the enterprise computing environment 100 may optionally include one or more computer systems which are not coupled to the enterprise computing environment 100 through a LAN 104.

B. System Architecture.

1. Hardware.

In the preferred embodiment, a variety of computer systems are able to periodically or continuously communicate with each other via a LAN, WAN or other network. In various embodiments, these computer systems may include personal computers 112a, laptops 114, servers 116, mainframes 120, personal digital assistants (PDAs), cellular telephones, workstations 110a or the like. However, one skilled in the art will recognize that the principles described herein would apply equally to these and a variety of other types of computer systems.

Figure 2:
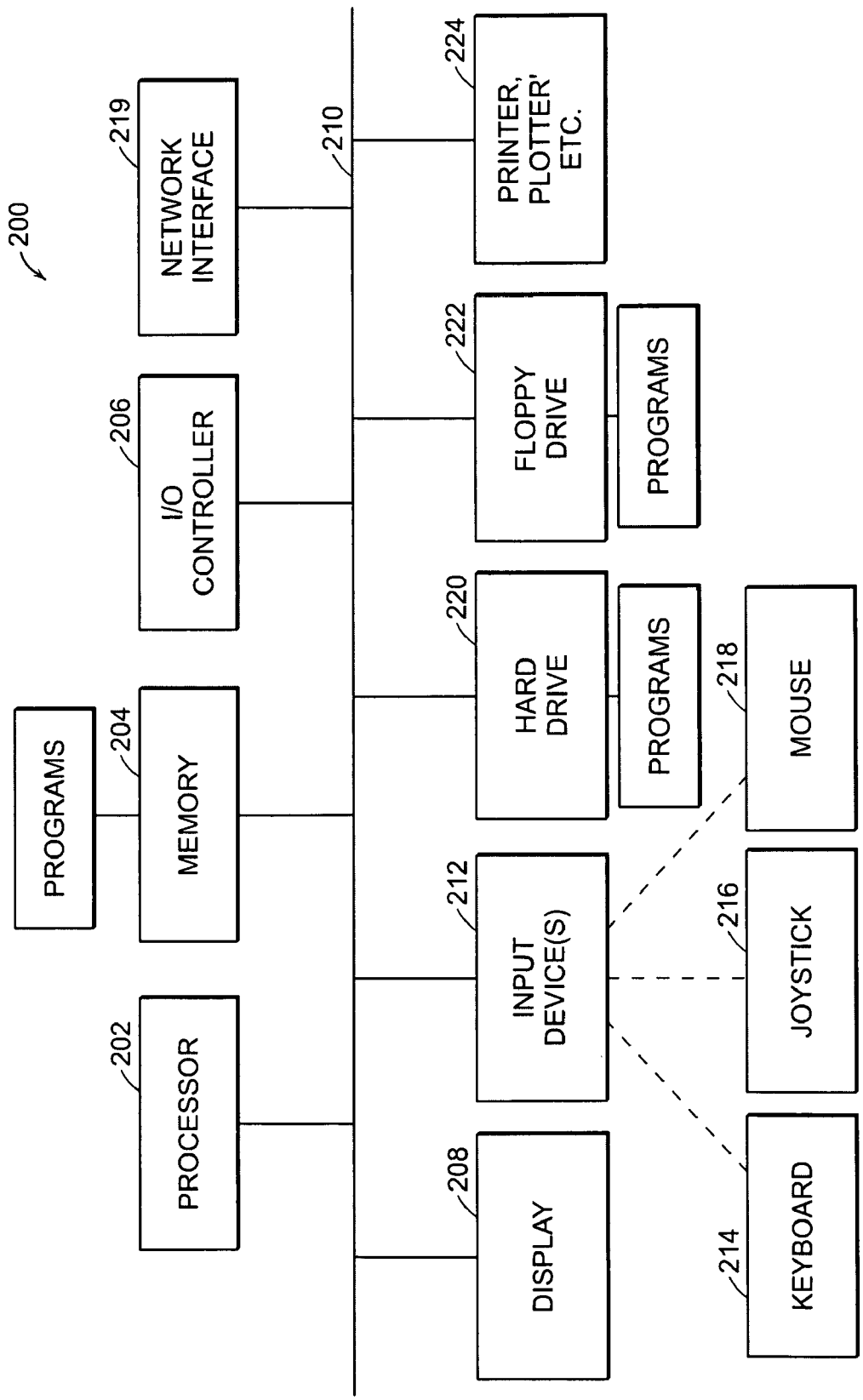
FIG. 2 is a block diagram illustrating aspects of a typical computer.

Referring now to FIG. 2, a typical computer system 200 includes a processor 202, a main memory unit 204 for storing programs and data, an input/output (I/O) controller 206, a display device 208, and a data bus 210 coupling these components to allow communication between these units. The memory 204 may include Random Access Memory (RAM)

and Read Only Memory (ROM). The computer system 200 typically also has one or more input devices 212 such as a keyboard 214 (e.g., an alphanumeric keyboard and/or a musical keyboard), a mouse 218, and, in some embodiments, a joystick 216. In addition, the computer system 200 is generally able to communicate with other computers and devices through a network interface 219, including, for example, Ethernet or WiFi communications hardware.

The computer system 200 also typically has a hard disk drive 220 and a floppy disk drive 222 for receiving floppy disks such as 3.5-inch disks. Other devices 224 also can be part of the computer system 200 including output devices (e.g., a printer) and/or optical disk drives for receiving and reading digital data on CD-ROM, DVD or other medium. In the preferred embodiment, one or more computer applications, or programs define the operational capabilities of the computer system 200. These programs can be loaded onto the hard drive 220 and/or into the memory 204 of the computer system 200 via the floppy drive 222. Applications may be caused to execute by double clicking a related icon displayed on the display device 208 using the mouse 218 or through various other means.

Figure 3:
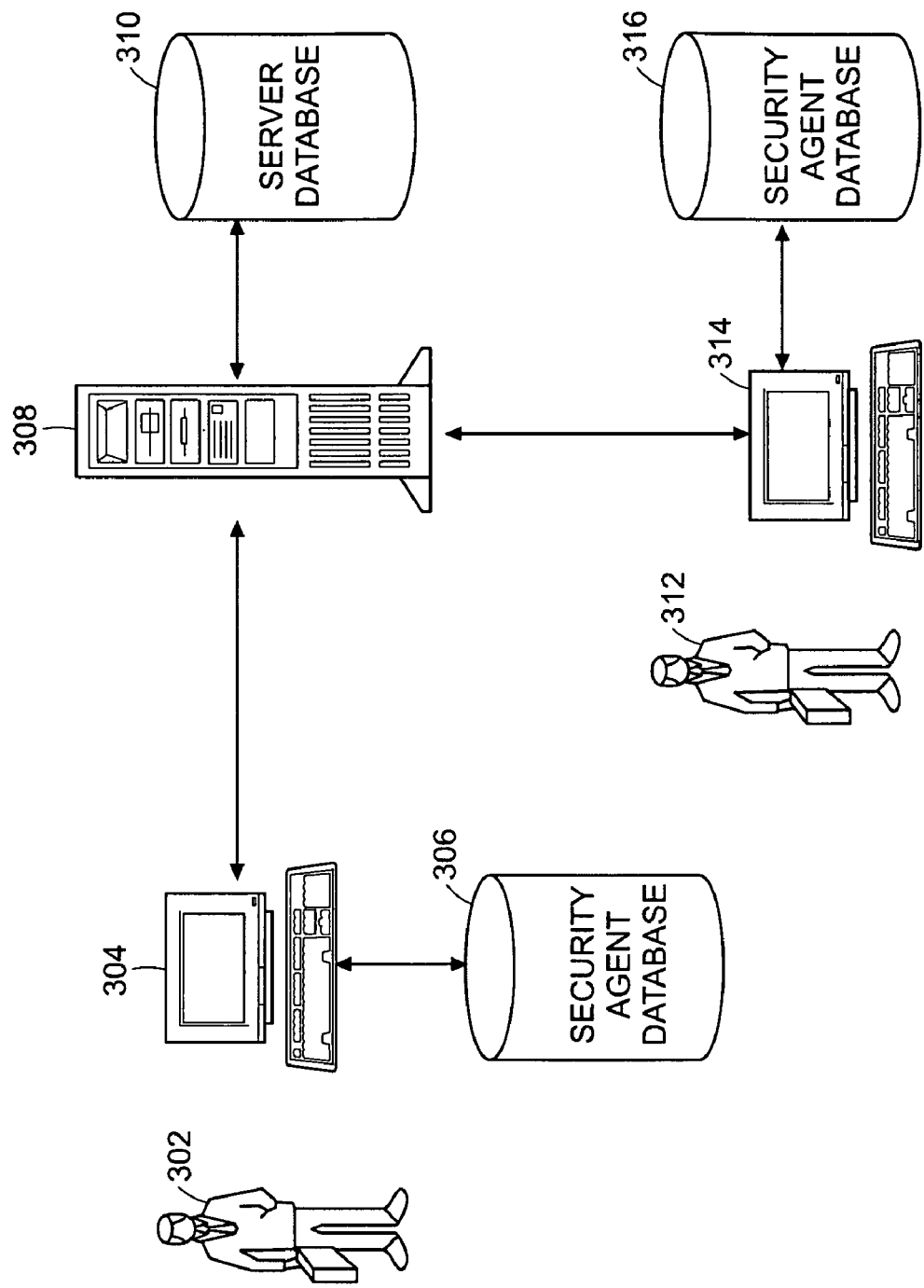
FIG. 3 illustrates the relationship between end users and computer systems in accordance with various embodiments of the invention.

FIG. 3 illustrates the relationship between end users and computer systems in accordance with various embodiments of the invention. As shown, an end user 302 interacts with his computer system 304 to access corporate information. As discussed previously, the computer system 304 may be, for example, a desktop computer, laptop computer, workstation, PDA, cell phone or other computing device intended for use by an end user. A Security Agent executes on the computer system 304, and accesses a Security Agent Database 306. As will be discussed, the Security Agent monitors the interaction between the end user 302, the computer system 304, and the applications that run on the computer system 304 and preferably, generates a risk score for that end user 302.

Also depicted is a second end user 312 interacting with a second computer system 314. Security Agent software executes on the second computer system 314 in order to monitor the second end user's interactions with that system. As before, the second computer system 314 preferably generates a second risk score specific to the second end user 312. The second computer system 314 also preferably stores and accesses information in a second Security Agent Database 316.

Each of the two computer systems 304, 314 may be in communication with a central server 308 through the use of a wired or wireless network. The respective communications channels between the server 308 and each computer system 304, 314, need not be permanent, as each computer system 304, 314 may be capable of tetherless operation when it is not connected to the server 308.

The server 308 also maintains its own Server Database 310 in which it preferably stores information relating to each end user 302, 312 and each computer system 304, 314.

2. Software.

Figure 4:
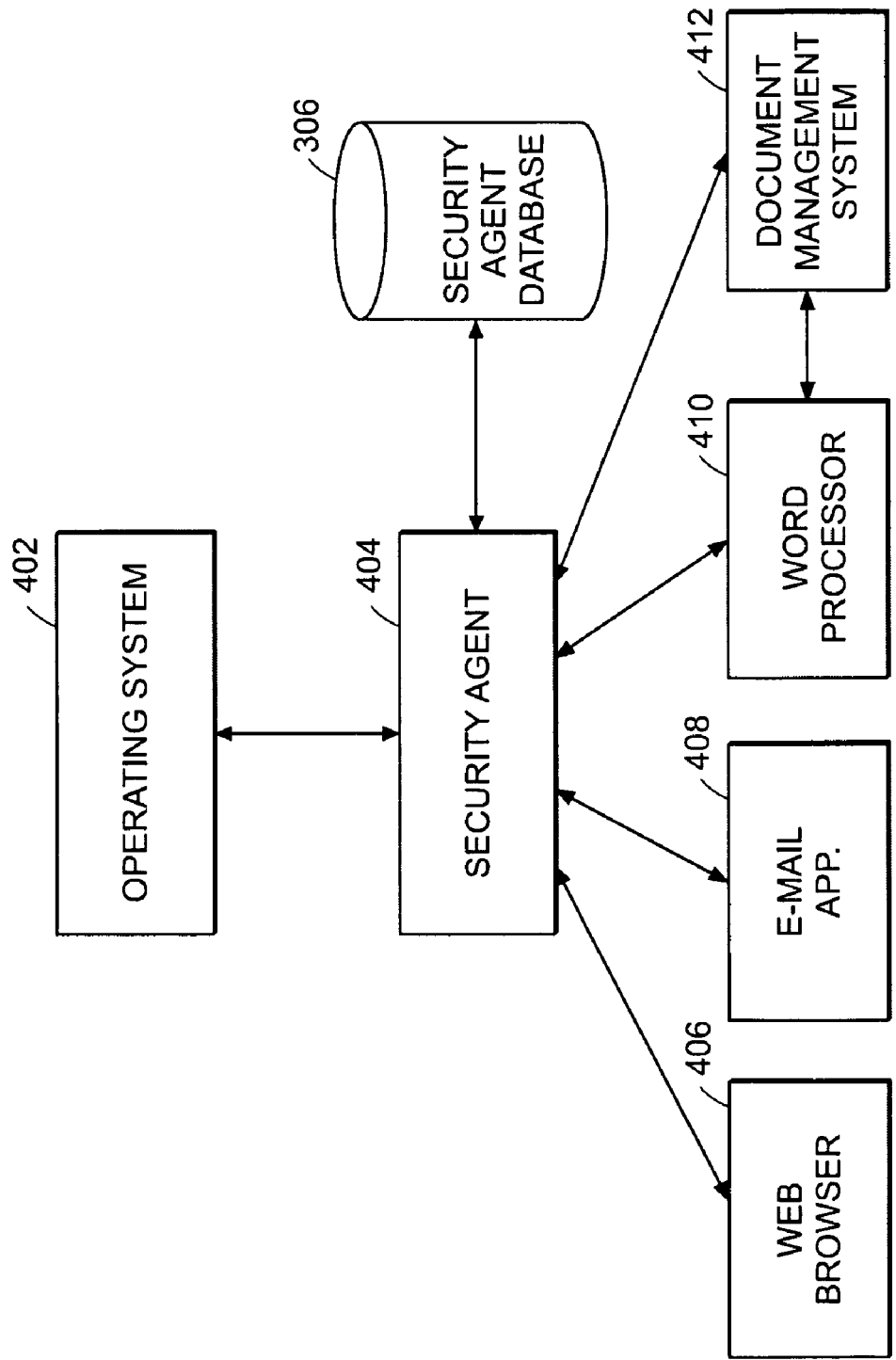
FIG. 4 is a block diagram illustrating different software components executing on a computer system according to an exemplary embodiment of the present invention.

FIG. 4 is a block diagram illustrating the different software components executing on the computer system 304 according to an exemplary embodiment of the present invention. As illustrated, applications executing on the computer system 304 include an operating system 402, a Security Agent 404, a web browser 406, an e-mail application 408, a word processor 410 and a document management system 412. In addition, a Security Agent Database 306 is also maintained and accessed by the computer system 304. The software components depicted in FIG. 4 and described in relation to the computer system 304 also can execute on the second computer system 314 and any other end user device in the enterprise computing environment 100 of FIG. 1.

The operating system 402 is responsible for performing basic tasks, such as recognizing input from a keyboard, sending output to a display screen, keeping track of files and directories on a hard drive and controlling peripheral devices such as scanners and printers. The operating system 402 is also responsible for managing the execution of other programs, including without limitation, the Security Agent 404, web browser 406, e-mail application 408, word processor 410, document management system 412 and Security Agent's Database 306. Windows® XP by Microsoft Corporation is one example of an acceptable operating system 402. The operating system 402 also maintains information relating to system security, memory usage, physical devices, currently executing processes, network communications, CPU usage and the like.

The web browser 406 is a software application typically used to locate and then display on the computer system 304 web pages or other information. The web browser 406 also typically maintains a list of a user's favorite web sites and facilitates communication with various web sites and Internet portals. In addition, the web browser 406 can also track information regarding web site accesses, including time between access and request, frequently accessed websites, privacy and security information, and descriptive information about a given web page. Common examples of acceptable web browsers 406 include Netscape Navigator by Netscape Communications Corporation and Internet Explorer by Microsoft Corporation.

In some embodiments, the web browser 406 is further used to send and receive e-mail. In alternate embodiments, e-mail is sent and received through a stand-alone e-mail application 408, such as Microsoft Outlook.

The word processor 410 is a software application typically used to create, modify, display and print documents. The word processor 410 also allows a user to store and retrieve said documents from either local (e.g. a hard disk internal to the computer system 304) or remote (e.g. a file server 124) storage locations. In addition, the word processor typically tracks recently accessed documents, document properties (e.g. date created, modified or accessed), document version and the like. Common word processors 410 include Microsoft® Word by Microsoft Corporation and WordPerfect by Corel Corporation.

Preferably, the word processor 410 interacts with a document management system 412 in order to track, store, secure and password protect documents. The document management system 412 may also co-ordinate storage of documents in a central database or other repository. Common document management systems include iManage DeskSite, by iManage, Inc. and DOCS Open by Hummingbird Ltd.

In the preferred embodiment, when software applications such as the web browser 406 and the word processor 410 are executed on the computer system 304, the Security Agent 404 is operable to monitor, analyze, and control these applications, as well as the resources and events of the computer system 304. The resources and events of the computer system 304 include, without limitation:

the processes and applications executing on the computer system 304;

the states of and kernel interactions with various physical devices;

end user input (e.g. text input, response to dialog boxes, application usage);

the system resources (e.g. CPU usage, memory usage and page file usage);

application events and errors (e.g. fatal exceptions and dialog boxes);

shared network resources (e.g. network adapter, link speed, latency and network utilization);

shared network systems (e.g. file servers 124 and printers 118);

other events facilitated by the operating system 402.

As discussed previously, the computer system 304 executes or runs a plurality of software applications or processes. Each software application or process consumes a portion of the resources of the computer system 304 and/or network. For example, CPU time, memory usage, hard disk usage, network bandwidth, and input/output (I/O). In the preferred embodiment, software comprising the Security Agent 404 continuously monitors the resources and events of the workstation, and periodically records information about said resources and events to the Security Agent's Database 306.

The Security Agent's Database 306 is a collection of information organized in such a way that it can quickly categorize, select, store and retrieve desired pieces of data relating to the resources and events of the computer system 304. Commercially available databases include Oracle Corporation's Oracle 9i Database, the DB2 Universal Database by International Business Machines Corporation or Microsoft Jet by Microsoft Corporation. The Agent's Database 306 may be stored in RAM 204 or on the hard disk 220. The Security Agent 404 uses the Agent's Database 306 to store and retrieve information related to the resources and events of the computer system 304.

3. The Security Agent.

Figure 5:
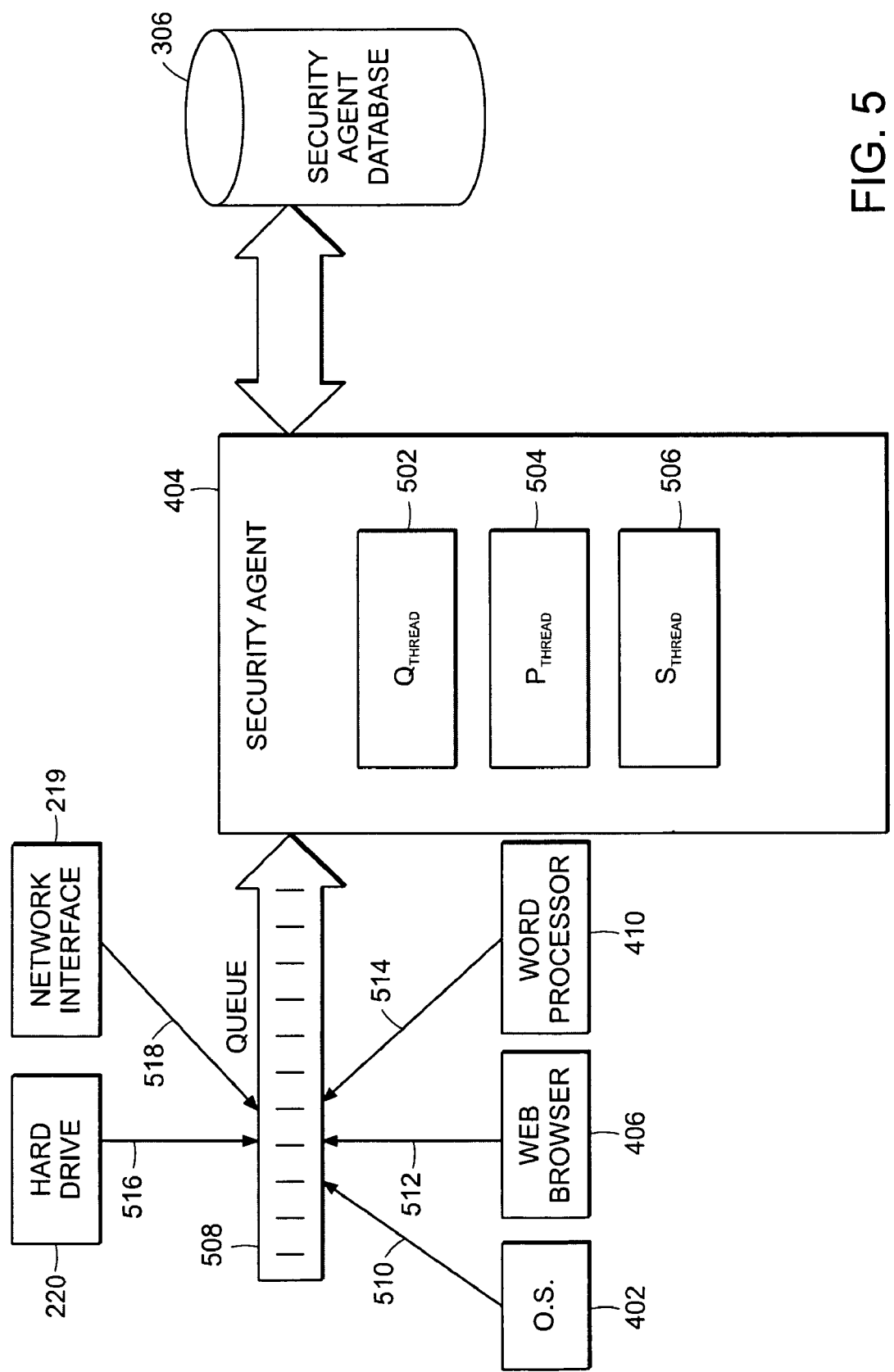
FIG. 5 is a block diagram illustrating the architecture of a security agent and its interaction with the applications executing on the computer system.

FIG. 5 is a block diagram illustrating the architecture of the Security Agent 404 and its interaction with the applications executing on the computer system 304. As illustrated, the Security Agent 404 is preferably a multi-threaded, multi-tasking software application. The primary purpose of the Security Agent 404 is to monitor an end user's 302 interactions with his computer system 304 and to develop a specific risk score for that end user 302. We will first describe the architecture of the Security Agent 404, and will subsequently illustrate its functionality.

In the preferred embodiment, three major threads affect the majority of the Security Agent's 404 tasks. Specifically, these three threads comprise a Queue managing thread (the "Othread") 502, a Process monitoring thread (the "Pthread") 504 and a Scheduling thread (the "Sthread") 506. These threads, along with other aspects of the Security Agent 404, work together to monitor and manage the resources and events of the computer system 304.

a. The Qthread.

The Qthread 502 will preferably be responsible for instantiation of both a Queue 508 and the Security Agent's Database 306. After the creation of the Queue 508 and Security Agent's Database 306, the Qthread 502 preferably manages the flow of data into and out of the Queue 508, organizes the Queue 508, and manages the data flow into and out of the Security Agent's Database 306.

Preferably, the Queue 508 will be a double-buffered data queue which allows for multiple process data writing and single process data reading. Upon initialization, the Security Agent 404 hooks into each currently running application via known hooking methodologies and establishes interception modules ("ZIntrcpt") 510, 512, 514 between each application and the Queue 508.

In the preferred embodiment, each ZIntrcpt module 510, 512, 514 continually monitors one application and periodically, or upon the occurrence of certain specified events, adds data to the Queue 508. The data added to the Queue 508 is application and context specific. For example, in the embodiment illustrated in FIG. 5, a first ZIntrcpt 510 is assigned to monitor the operating system 402. The first ZIntrcpt 510 watches the processes and variables of the operating system 402, and periodically writes to the Queue information such as the percentage of CPU used on each currently executing application, the memory usage and the network usage by the computer system 304. In this embodiment, a second ZIntrcpt 512 is assigned to monitor the web browser 406. As the web browser 406 executes, the second ZIntrcpt 512 writes information to the Queue 508 concerning the pages that the web browser 406 has visited, the latency between page requests and page views, the time of day that each page is viewed, and whether or not data is being transmitted and received in a secure or encrypted fashion. Similarly a third ZIntrcpt 514 monitors the word processor 410 and writes information to the Queue 508 regarding the documents accessed, whether or not each accessed document contains certain keywords, the length of time necessary to store and retrieve documents, and any errors or exceptions which occurred during operation of the word processor 410. Note, although in this embodiment the ZIntrcpts 510, 512 and 514 are assigned to monitor applications and record data as set forth above, one skilled in the art will recognize that virtually any data from any application may be monitored and recorded in similar fashion.

Also at the time of initialization, the Security Agent 404 hooks into the operating system kernel via known hooking methodologies, and establishes kernel interception modules ("KIntrcpt") 516, 518 at the kernel level for each physical device. As illustrated, the KIntrcpts 516, 518 monitor a hard drive 220 and network interface 219. One skilled in the art will recognize that the KIntrcpts 516, 518 could monitor the interactions between any physical device and the kernel.

As with the ZIntrcpts 510, 512, 514, the KIntrcpts 516, 518 watch the kernel and the physical devices comprising the computer system 304. Periodically, the KIntrcpts 516, 518 write information to the Queue. In this embodiment, a first KIntrcpt 516 is assigned to monitor the hard drive 220. As the hard drive 220 spools up, or is activated at the behest of the kernel, the KIntrcpt traps and writes information about this hard drive access to the Queue 508. This information may include a description of which files were accessed, whether they were read, written or re-written, and whether or not any copy-protection or other flags were set.

A second KIntrcpt 518 preferably monitors the network interface 219, and traps and writes information about the network interface's 219 network communications to the Queue 508. This information may include, for example, the I.P. or MAC address of the computer being accessed, and the data that was transmitted or received via the network.

In the event that either: (a) an end user's risk score exceeds a certain threshold; (b) the Security agent 404 detects a security breach (e.g. through the KIntrcpt or ZIntrcpt traps or otherwise); or (c) the Security Agent 404 experiences an interrupt, error or other event outside of its normal operating parameters, the event will be designated as an "exceptional event." The Security Agent 404 will then immediately analyze the exceptional event, along with historical information stored in its database 306 in order to respond appropriately, as will be described below.

As the ZIntrcpts 510, 512 and 514 and KIntrcpts 516, 518 add data to the Queue 508, the Qthread 502 continually monitors and analyzes the Queue's 508 content. In the event that the Queue 508 nears its capacity, the Qthread 502 flushes data to the Security Agent's Database 306. In addition, as the Qthread 502 encounters any urgent system alerts or events within the Queue 508, the Qthread immediately provides them to the Security Agent 404, records them in the Security Agent's Database 306 and preferably initiates emergency action routines within the Security Agent 404.

b. The Pthread.

In the preferred embodiment, the Pthread 504 will continually monitor the various processes, services and applications that are running on a computer system 304. Preferably, the Pthread queries the operating system 402 to determine the current status of the processes, resources, and events of the computer system 304. The Pthread 504 preferably reviews and analyzes this data (whether through the use of the Queue or not), and compares it with historical information saved in the Security Agent's Database 306. For example, the Pthread 504 can receive new information about the various operating parameters of the running processes, the order in which they are run, and whether they are newly executed processes and compare this information with historical information of the same type previously stored to the Security Agent's Database 306. In certain circumstances (for example, if the end user's 302 behavior puts corporate information at risk), the Pthread can also initiate emergency action routines within the Security Agent 404.

c. The Sthread.

In the preferred embodiment, the Sthread 506 initializes and maintains lightweight processes, or scheduled items that perform a variety of useful functions with minimal use of the CPU. Preferably, the scheduled items perform a task or set of tasks periodically. For example, every five seconds, a scheduled item can check with the operating system 402 to determine whether or not the end user 302 using the computer system 304 is idle. If the end user 302 is in fact idle, then the Sthread 506 will preferably perform a variety of useful, processor-intensive functions including, for example, compacting the Security Agent's Database 306 or deleting unnecessary information from RAM 204 or from the hard disk 220. In addition, on a timely basis and when required, the Sthread 506 is also responsible for aggregating and pruning the Agent's database and cleaning up any internal data structures.

In addition, a scheduled item can perform a variety of routine analysis tasks and record the requisite data to the Security Agent's Database 306. For example, in the preferred embodiment, a scheduled item may request and retrieve certain performance statistics from the operating system 402 every three seconds including, without limitation, a risk score assigned to a particular end user 302, process CPU usage, memory usage and asset utilization. This three-second data snapshot can then be analyzed by the Security Agent 404, further summarized and/or stored in the Security Agent's Database 306.

4. The Server.

When one or more Security Agents 404 are executing on one or more computer systems 304, the embodiments of the claimed invention will provide a network administrator or server 116 which collects, tracks and responds to data produced by each Security Agent 404.

The server 116 comprises a computer system upon which server software is executing. Like the Security Agent 404, the server 116 will maintain its own database (the Server D.B. 614, illustrated in FIG. 6). In the preferred embodiment, the server 116 is substantially similar to the Security Agent 404, but also provides additional functionality not present in the Security Agent 404. This additional functionality allows the server 116 to manage a plurality of Agents 404. In addition, the server 116 can install or delete software from each Security Agent 404, can provide instructions for each Security Agent 404 and can respond to queries from each Security Agent 404. Furthermore, the server 116 can generate a plurality of reports based on the analysis of information it has received from each Security Agent 404. Preferably, the server 116 can also generate reports or analyses relating to its own applications, resources and events. Accordingly, the server 116 is operable to monitor, analyze, and manage the applications, resources and events of both itself and of a plurality of Security Agents 408.

Preferably, the server 116 periodically receives from each Security Agent 404 a data snapshot comprising information about the Security Agent's 404 resources and events. Like the three-second data snapshot described previously, this data snapshot would include such items as the end user's risk score, process CPU usage, memory usage and asset utilization. However, one skilled in the art will understand that any data regarding the applications, resources or events of the Security Agent 404 may be used. In contrast to the three-second data snapshot described previously, this data snapshot would be sent less frequently than the data is actually measured. In the preferred embodiment, for example, this data snapshot could be taken once every five minutes. In this way, the server 116 receives significantly less information than is measured by each Security Agent 404. Although network traffic is minimized, the existing granular data at three second intervals is still available within each Security Agent's Database 306 should it ever be needed for forensic analysis and diagnosis.

In the event that a Security Agent 404 detects an exceptional event (as defined previously), the Security Agent 404 may choose to notify a server 116 of the exceptional event. In that case: (a) the server 116 may provide instructions to the Security Agent 404 as to how to handle the exceptional event; (b) the server will be alerted as to the possibility of similar exceptional events occurring in other Agents 408; and (c) a human network administrator or information technology specialist operating the server 116 can be appraised of the exceptional event and take further action as necessary such as examining a detailed audit trail of the end users interactions.

Should an Security Agent 404 ever be disconnected or otherwise unable to immediately communicate with a server 116, such Security Agent 404 can store in its Security Agent's Database 306 all data snapshots as well as all exceptional events that it experiences while disconnected, and can transmit this information when once again it is able to communicate with the server 116.

In addition to using the server 116 as a trouble shooting tool and information gathering appliance, a network administrator operating the server 116 can also preferably query and manage the software configurations of various Security Agents 404. For example, if a network administrator desires to determine the average risk score for each end user 302, each networked Security Agent 404 may be polled. If the average risk score is outside a predetermined threshold, the server 116 could isolate all end users 302 with above-average risk scores from the network.

Similarly, the server 116 could also perform such functions as counting the number of Security Agents 404 which have licensed virus scanning software stored on their local hard drives. Upon receipt of this query, each Security Agent 404 could respond to the server 116, facilitating an accurate count. With this knowledge, the network administrator could then purchase licenses for and install copies of the software as needed. Alternately, the administrator could delete licensed virus scanning software from computer systems 302 that do not need such software. In this fashion, a network administrator may efficiently monitor both the types of security applications and licenses for such applications on computer systems 302 throughout the entire enterprise computing environment 100.

While the server 116 is preferably included within the management infrastructure of the enterprise computing environment 100, it is important to note that no server 116 would be necessary in alternate embodiments of the claimed invention. For example, any Security Agent 404 can preferably communicate with any other Security Agent 404 to request assistance in responding to an exceptional event. Alternately, any Security Agent 404 can preferably communicate with any other Security Agent 404 to notify said other Agent of a problem with a shared resource (e.g., a printer 118 or a local area network 104) or of a security breach. In this fashion, Agent-Agent communication may substitute in many ways for agent-server communication in a variety of embodiments, and particularly in peer-to-peer networks.

Figure 6:
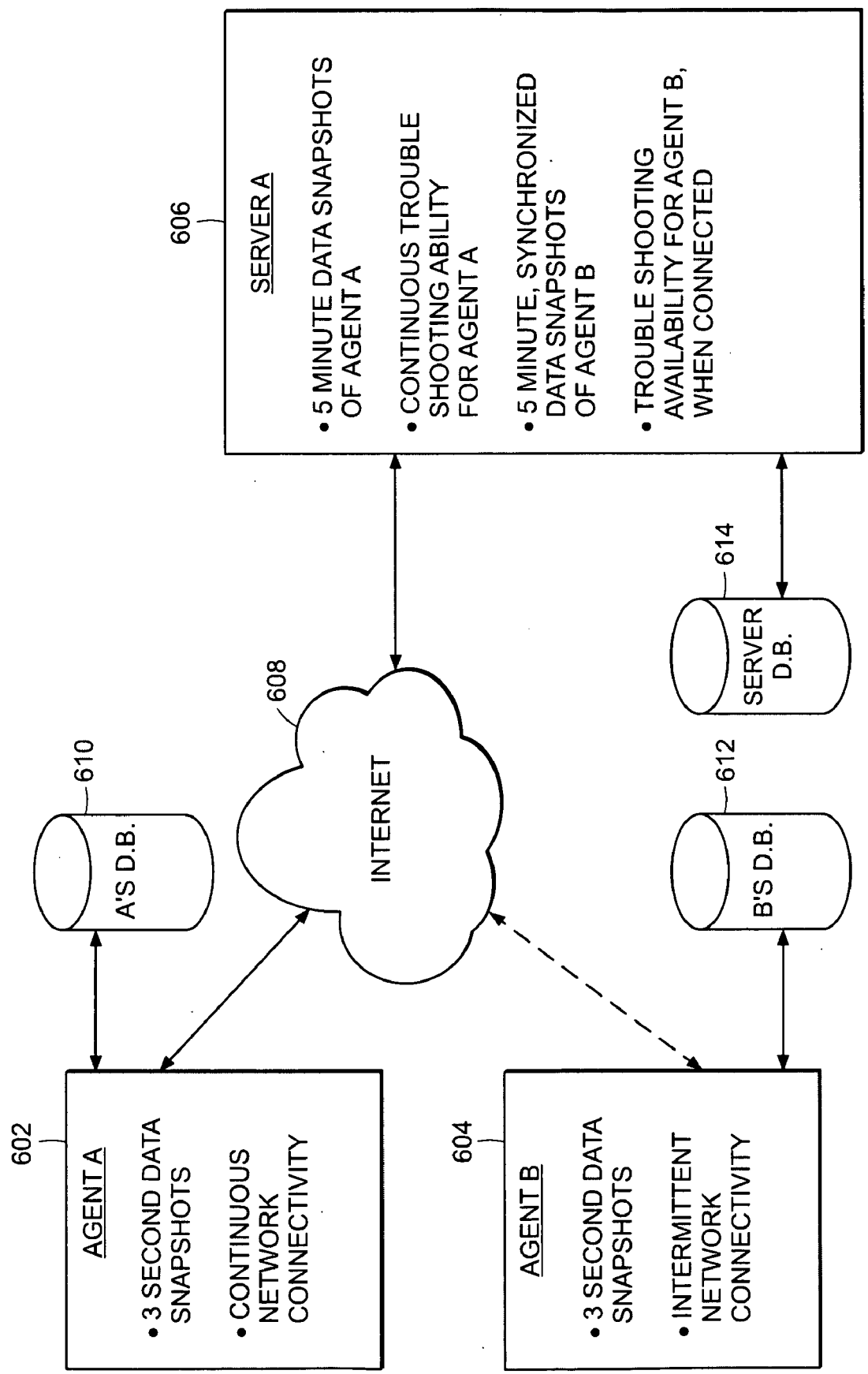
FIG. 6 illustrates a sample networked environment within an enterprise management system.

FIG. 6 illustrates a sample networked environment within the enterprise management system. In the preferred embodiment, one or more Agents 404 are connected with one or more other Agents 404 and one or more servers 116. As shown in FIG. 6, Agent A 602, Agent B 604 and Server A 606 are all connected with one another through the Internet 608. While Agent A 602 and Server A 606 are continually connected to one another through the internet 608, Agent B 604 is only occasionally connected to the Internet 608. Thus, communications between Agent A 602 and Agent B 604 or between Server A 606 and Agent B 604 occur only when Agent B 604 is connected to the Internet 608.

As illustrated, each server and agent is connected to its own database. Thus, Agent A 602 is connected to A's database (D.B.) 610. Agent B 604 is connected to B's database (D.B.) 612. Similarly, Server A 606 is connected to a Server database (D.B.) 614.

C. Calculation of Risk Scores.

With the basic architecture of the system thus described, we will now turn to the methods by which the preferred embodiments of the claimed invention calculate one or more risk scores for one or more end users.

In the preferred embodiment, a risk score is calculated for each end user who accesses proprietary corporate data through a computer system. Each risk score will preferably be based upon both the information to which the end user has access and the end user's interactions with his computer system.

More specifically, the risk score for each end user will be based upon a weighted average of a number of factors. Preferably, one component of the risk score will come from transitory information describing the end user's interactions with the computer or with applications executing on the computer. This transitory information will preferably be trapped by a ZIntrcpt 510, 512, 514 or KIntrcpt 516, 518 and placed on the Queue 508 for later processing. Transitory information will generally comprise data relating to the end user's interactions with a computer system, and may include:

- information displayed in a dialog box to the end user (e.g. system alerts);
- information not customarily logged by the operating system;
- information not customarily logged by an application (e.g. dialog box text);
- information regarding the end user's e-mail activities (e.g. sent and received email)
- information regarding the end user's file transfer activities (e.g. FTP or file copy logs); or
- information regarding the end user's interactions with untrusted or external web sites or computer servers.

Logically, the transitory information will affect values different risk categories, which will be combined in order to form a total end user risk score. Preferably, the risk categories will include, without limitation:

Data Risk;
Application Risk;
Password Risk;
Concealment Risk;
E-mail Risk; and
Asset Risk.

Data Risk reflects the value of sensitive information in a document or other data source and its risk of disclosure, corruption or deletion. In various embodiments, the data may be a word processing document, a spreadsheet, source code, or any other form of computer-readable data such as may exist in a database or on an intranet website. Preferably, Data Risk is assessed for each document or data source to which a given end user has access. A data source is preferably assigned a Data Risk score based upon its attributes. The Data Risk score may then be used to determine an end user's risk score, or even the total risk score for a group of end users or documents.

The attributes which comprise Data Risk in one embodiment are illustrated below in Table 1. Attributes are listed on the left, with total possible points allocable to each attribute listed on the right. In this embodiment, if the data is edited by more than one person, the Data Risk will be increased by up to ten points. If, for example only one person accesses the data source, then perhaps only one point will be assessed to the "Edited by more than one person" attribute. If, conversely, fifty people access this data source, then the "Edited by more than one person" attribute may score the full ten points. Similarly, if the data is stored in a secure location on a trusted server, the "Network location" attribute may receive the entire allocable five points. If the data is stored on a publicly available server outside the company's firewall, then the "Network location" attribute might only receive a score of one point.

In similar fashion, all of the attributes specified in Table 1 are preferably combined to form an overall Data Risk. In this embodiment, the Data Risk score itself can contribute up to 100 total possible risk points towards an end user's risk score. One skilled in the art will recognize that the attribute scores depicted in Table 1, and throughout the remainder of this specification are purely exemplary, and will change depending on the particular embodiment. Similarly, an end user's risk score will vary depending upon which types of attributes are combined to form the total end user risk score. One will also recognize that, as illustrated in Table 1, the data risk scores themselves can be combined or averaged to determine an average risk score for a plurality of data sources.

TABLE 1

Data Risk.
Data Risk

| Attribute | Allocable Risk Points |
|---|---|
| Per data source | |
| Edited by more then one person. | 10 |
| Network location. | 5 |
| Removable media location. | 10 |
| Keyword match (confidential, do not forward). | 40 |

TABLE 1-continued

Data Risk.
Data Risk

| Attribute | Allocable Risk Points |
|---|---|
| Password protected. | 5 |
| Encrypted store location. | 5 |
| Downloaded data (email, internet). | 10 |
| Automation data source (script). | 5 |
| Classified data source type. | 10 |
| Total possible risk points. | 100 |
| Per all documents | |
| Average risk of all data sources | 33.3 |
| Average risk of data locations. | 33.3 |
| Average count of data editing applications. | 33.4 |
| Total possible risk points. | 100 |

Application Risk reflects the likelihood that an end user's use of a given application will result in the disclosure, deletion or corruption of sensitive information accessed by that application. In various embodiments, applications may include, without limitation, a web browser 406, e-mail application 408, word processor 410 or document management system 412 (see FIG. 4). Preferably, Application Risk is assessed for each application to which a given end user has access. The Application Risk score may then be used to determine an end user's total risk score, or even the total risk score for a group of end users or applications. The attributes which comprise Application Risk in this embodiment are illustrated below in Table 2.

TABLE 2

Application Risk.
Application Risk

| Attribute | Allocable Risk Points |
|---|---|
| Per application | |
| Network access. | 2.5 |
| Network file share access. | 2.5 |
| Password protected application. | 10 |
| Edits/saves documents. | 2.5 |
| Database access. | 10 |
| Known spyware. | 20 |
| File system scanning applications. | 2.5 |
| Applications that elevate their privilege level. | 10 |
| Applications that open listen sockets. | 8 |
| Applications that host browser controls. | 8 |
| Applications that host activex controls. | 8 |
| Applications that host Java. | 8 |
| Classified risky applications. | 8 |
| Total possible risk points | 100 |
| Per all applications | |
| Average risk of applications run. | 25 |
| Count of network applications. | 25 |
| Count of spyware apps. | 25 |
| Amount of time spent in highest risk apps. | 25 |
| Total possible risk points | 100 |

Password Risk reflects the likelihood that an end user's password will be compromised, enabling unauthorized disclosure, deletion or corruption of sensitive information. In various embodiments, Password Risk may be determined by the complexity of an end user's chosen password, how often he changes that password, and whether or not the end user shares that password with either other individuals or various applications. As before, the Password Risk score may then be used to determine an end user's total risk score, or even the total risk score for a group of end users. The attributes which comprise Password Risk in this embodiment are illustrated below in Table 3.

TABLE 3

Password Risk.
Password risk

| Attribute | Allocable Risk Points |
|---|---|
| Per password | |
| Password complexity. | 40 |
| Password is static. | 10 |
| Password is shared (amongst apps and servers). | 10 |
| Password is shared (amongst intranet & internet). | 40 |
| Total possible risk points | 100 |
| Per all passwords | |
| Average risk of passwords. | 33.3 |
| Total count of passwords. | 33.3 |
| Cross-section of passwords and risky applications. | 33.3 |
| Total possible risk points | 100 |

Concealment Risk reflects the likelihood that an end user will intentionally or maliciously transmit sensitive information to unauthorized parties using secure or encrypted communications channels. This risk level increases as the end user employs potentially covert or secret communications techniques from his computer system with increasing frequency. As before, Concealment Risk may then be used to determine the risk score for an end user or a group of end users. The attributes which comprise Concealment Risk in this embodiment are illustrated below in Table 4.

TABLE 4

Concealment Risk.
Concealment Risk

| Attribute | Allocable Risk Points |
|---|---|
| Access SSL protected sites. | 10 |
| Uploads through SSL protected sites. | 30 |
| Encrypts file system. | 20 |
| Creates password protected documents. | 15 |
| Creates password protected zip files. | 25 |
| Total possible risk points | 100 |

An end user's E-mail Risk characterizes the possible disclosure of sensitive information or attacks upon a computer system through the use of e-mail. This risk level would preferably increase as the end user received increasing amounts of unsolicited e-mail, or spam. It would also increase for a variety of other factors, which, for one embodiment, are disclosed below in Table 5. As before, E-mail Risk may be used to determine the risk score for an end user or a group of end users.

TABLE 5

E-mail Risk.
E-mail Risk

| Attribute | Allocable Risk Points |
|---|---|
| Per e-mail account risk | |
| Spam recipient. | 5 |
| Attachment recipient. | 5 |
| Virus recipient. | 10 |
| HTML mail recipient. | 10 |
| Sends attachments. | 15 |
| Sends dangerous attachments. | 20 |
| Sends external email. | 5 |
| Forwards to other personal email accounts. | 15 |
| Has access to multiple internal accounts. | 5 |
| Downloads files from account | 10 |
| Total possible risk points | 100 |
| Per all email accounts | |
| Average email account risk. | 50 |
| Accesses external email accounts. | 50 |
| Total possible risk points | 100 |

An end user's Asset Risk is the chance that computer systems he uses and the way in which he uses them will contribute to the unauthorized disclosure, corruption or deletion of sensitive corporate information. Table 6, below, discloses various attributes which may be evaluated in order to determine a given Asset Risk, in one embodiment of the claimed invention.

As illustrated, an end user's overall Asset Risk will preferably include Peripheral Risk, Configuration Risk, Account Risk and Mobility Risk. Peripheral Risk reflects the ability of an end user to print, copy and transmit sensitive information through the use of peripheral devices (e.g., printers, modems, Zip drives, etc.). Configuration Risk depicts the chance that an unauthorized user will be able to hack into or otherwise access the end user's computer system. Account Risk characterizes the likelihood that a given computer system could be compromised by an unauthorized user. Mobility Risk relates to the specific weaknesses in personal digital assistants, wireless laptop computers, cellular telephones, and other mobile peripherals. Taken together, these risks contribute to an overall Asset Risk, which in turn can be used to help evaluate the risk score for a given end user, or group of end users.

TABLE 6

Asset Risk.
Asset Risk

| Attribute | Allocable Risk Points |
|---|---|
| Peripheral Risk | |
| Has access to printers. | 5 |
| Uses printers. | 15 |
| Has writeable removable media. | 5 |
| Uses writeable removable media. | 15 |
| USB Ports on device. | 5 |
| Uses USB devices. | 15 |
| Has modem. | 5 |
| Uses modem. | 15 |
| Has wireless access. | 5 |
| Uses wireless. | 15 |
| Total possible risk points | 100 |
| Configuration Risk | |
| Device is not password protected. | 20 |
| Device is weakly password protected. | 10 |
| Device is infrequently used. | 10 |
| Device does not have password protected screensavers. | 10 |
| Device has vulnerabilities (O.S. patch). | 30 |
| Device is frequently reconfigured. | 10 |
| Device has new software. | 10 |
| Total possible risk points | 100 |
| Account Risk | |
| Device has many unused login accounts. | 10 |
| Device accounts are not domain managed. | 30 |
| Local device passwords are not compliant. | 30 |
| Suspicious account login activity has been recorded. | 30 |
| Total possible risk points | 100 |
| Mobility Risk | |
| Device does synchronization. | 10 |
| Files are migrated to device. | 30 |
| Files are migrated from device. | 20 |
| Device is email store. | 40 |
| Total possible risk points | 100 |
| Per all assets | |
| Average peripheral risk. | 25 |
| Average configuration risk. | 25 |
| Average account risk. | 30 |
| Average mobility risk. | 20 |
| Total possible risk points | 100 |

D. Operation of the Preferred Embodiments

Figure 7:
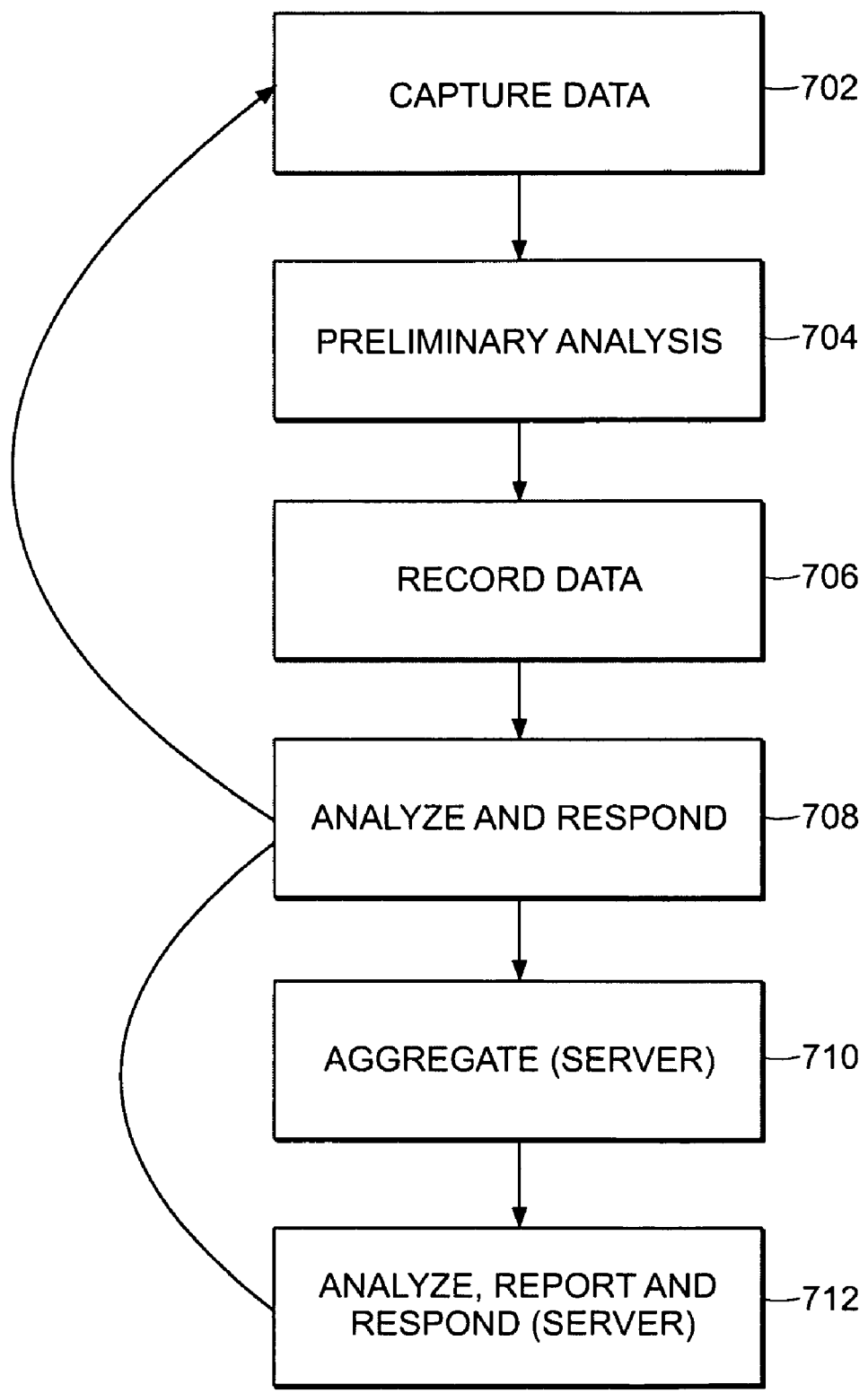
FIG. 7 is a flow chart illustrating the operation of one embodiment of the present invention.

We will now turn to the operation of the preferred embodiments of the claimed invention. FIG. 7 is a flow chart illustrating the operation of one embodiment of the present invention. As illustrated, at least six steps comprise the preferred method of operation: capturing data 702, conducting a preliminary analysis 704, recording data 706, analyzing and responding to the data 708, aggregating the data 710, and analyzing reporting and responding 712.

The step of capturing data 702 may either be triggered periodically (e.g. once every three seconds), in response to an external event (e.g., a request from a server 116), or in response to an end user's 302 interaction with his computer system 304 (e.g., opening a file, starting an application, etc.). Once the data capture step 702 is triggered, KIntrcpt 516, 518 and ZIntrcpt 510, 512, 514 trap data from applications, the operating system, and even physical devices. During data capture 702, information describing various risk factor attributes is inserted into the Queue 508. This information may include, for example:

The location of a file being opened.

Whether or not data is being driven to a network interface.

Whether the end user is attempting to send an e-mail.

The time when the computer system was last scanned for viruses.

Whether the working document contains any key words (e.g., "confidential").

Whether the user is engaged in any prohibited actions (e.g., copying files to an external device).

Next, a preliminary analysis 704 takes place. During preliminary analysis 704, the trapped information is evaluated to assess whether or not there is an immediate security risk posed by the end user's actions, or whether an exceptional event has taken place. In one embodiment, the Security Agent 404 may thoroughly examine the data which the end user is attempting to access prior to allowing the application 410 access to the data. If the data contains certain keywords (e.g., "privileged") or the end user 302 is unauthorized to access the data, then the Security Agent 404 may prevent the computer system 304 from displaying the data to the end user 302.

At this point, the end user's risk score is preferably updated. Depending upon the actions the end user 302 has taken, his personal risk score may be increased or decreased. In some embodiments, the end user 302 may be shown his own risk score, or a variant thereof.

If, during preliminary analysis 704, the end user's risk score does not exceed a specified level, and if his actions do not indicate any urgent security risks or exceptional events, the data is merely allowed to progress down the queue 508, until it is eventually processed by the Security Agent 404.

The Security Agent 404 removes data from the Queue 508 in a First-In First-Out ("FIFO") fashion. In one embodiment, the Security Agent 404 aggregates and sums the data as it is removed from the Queue 508 for further analysis. Thereafter, the Security Agent 404 records this data (step 706) to the Security Agent's Database 306.

During the Analyze and Respond stage 708, the Security Agent 404 analyzes the data received from the Queue, and optionally compares it with data stored in the Security Agent Database 306. After determining whether a given action increases an end user's risk score above a predetermined threshold, the Security Agent may take one or more actions, including:

Alerting the end user to the potential security risk created by his actions.

Blocking the end user's actions.

Requesting confirmation that the end user wishes to proceed, despite the risk.

Halting the system.

Logging the end user out of the system.

Disconnecting the computer system from the network.

Warning a server or an administrator of the end user's actions.

Displaying the risk score to the end user.

If the end user's actions do not pose a security risk to the computer system 304, or if the security risk is handled by the Security Agent's responses, then the process may loop, returning to the step of capturing data 702. Alternately, the Security Agent 404 may push information to a server 116 which aggregates (step 710) and optionally analyzes, reports and responds (step 712) to the Security Agent.

The operation of preferred embodiments of the claimed invention are described below through the use of hypothetical scenarios and with reference to FIGS. 1-7.

1. Typical Data Capture, Analysis and Response at a Computer System.

Assume an end user 302 is utilizing Agent A 602, a computer system 304, which is serving as a Security Agent 404. Agent A 602 is connected to the Internet. At this point in time, the end user 302 is using a word processing program to edit a document. The document contains no sensitive information, and the end user 302 is accessing the document over an internal network in a permissible fashion.

At regular intervals (e.g., every three seconds), a scheduled item within Agent A 602 initiates a query to capture data (step 702) describing process, asset, resource and event information from the operating system 402. A ZIntrcpt 510 traps the requested resource and usage information from the operating system 402 and enters said information into the Queue 508. Similarly, a KIntrcpt 518 traps kernel information relating to the network interface 219, and enters that information into the Queue. Collectively, the information trapped by the KIntrcpt 518, ZIntrcpt 510 and from the operating system 402 forms a normal dataset.

The Qthread 502, which continually reads information within the Queue 508, conducts a preliminary analysis (step 704) on the normal dataset. During this preliminary analysis 704, the normal dataset is evaluated to determine whether or not the end user's actions cause an immediate security violation. As the end user's 302 use is permissible, there is no immediate security violation. In addition, during the preliminary analysis 704, Agent A 602 verifies that the current risk score for the end user 302 is within an acceptable range.

After verifying that the end user's 302 risk score is within the specified limits, and determining that the normal dataset does not comprise an exceptional event, Agent A 602 allows the normal dataset to remain in its place within the Queue 508 for later processing.

As mentioned previously, each Security Agent 404 removes information from the Queue 508 in a FIFO fashion. Accordingly, the normal dataset is eventually obtained and evaluated by Agent A 602. At this point, Agent A 602 preferably records the data (step 706). Thereafter, Agent A 602 compares the normal dataset with datasets previously stored within A's D.B. 610. As the variance between the normal dataset and the datasets previously stored within A's D.B. 610 is within tolerance limits, Agent A 602 stores the normal dataset in A's D.B. 610.

As it has been five minutes since Agent A 602 last transmitted a dataset to Server A 606, Agent A 602 transmits the normal dataset to Server A 606 through the Internet 608. Server A 606 receives the normal dataset from Agent A 602 and analyzes it for irregularities. Finding none, Server A 606 records the normal dataset in its Server D.B. 614. The cycle repeats, with Agent A 602 recording another normal dataset every three seconds and Server A 606 recording a normal dataset every five minutes.

2. Security Violation Handling.

Assume the second end user 312 is currently browsing the web through the use of the computer system 314, upon which another Security Agent 404 is executing. As this end user 312 navigates the web, he decides to e-mail a confidential document to an untrusted party.

As specified previously, a Security Agent 404 is currently executing on this computer system 314. Accordingly, a ZIntrcpt 512 is constantly monitoring both his e-mail 408 and word processing software 410. ZIntrcpt 512 traps on the end user's 312 mouse click action triggering the sending of the suspect e-mail, and immediately places descriptive information in the Queue 508 (the "exceptional dataset").

The Qthread, which continually reads information within the Queue 508, reads the exceptional dataset and, recognizing its importance, removes it from the Queue 508 and passes it directly to the Security Agent 404 for evaluation. The Security Agent 404, upon receipt of the exceptional dataset, recognizes that the end user 312 is attempting to engage in an impermissible action, and promptly records the exceptional dataset into the Security Agent's Database 306.

Contemporaneously, the Security Agent 404 determines that this action increases the end user's 312 risk score beyond his predetermined threshold. The Security Agent 404 preferably initiates four different error-handling routines. First, the Security Agent 404 notifies the end user 312 that by e-mailing the confidential document to an untrusted recipient, he is risking disclosure of sensitive corporate information, and asks the end user whether or not he wishes to proceed. Second, the Security Agent 404 searches its Database 306 to determine whether or not this end user 312 has attempted a similar action in the past. The Security Agent 404 does not find any relevant prior information stored in its Database 306. Third, the Security Agent 404 displays to the end user 312 his increased risk score. Fourth, the Security Agent 404 notifies an administrator of the actions of the end user 312.

Upon approval by the administrator, and acknowledgement by the end user 312 that the attempted e-mail is still desirable, despite the risk, then the computer system 314 forwards the suspect e-mail to the designated recipient and records for audit trail purposes that the act by the end user was permissible and that the administrator approved such an action.

3. Intermittent Connections to Other Agents and Servers.

As another example, assume that Agent B 604 is executing on a laptop computer 114 and is configured to run precisely the same as Agent A 602. However, as Agent B 604 is mobile, it is only able to connect to the Internet 608 for brief periods of time between long delays. Thus, Agent B 604 cannot constantly communicate with Agent A 602 or Server A 606. Accordingly, Agent B's 604 must operate autonomously while disconnected from the Internet 608.

Like Agent A 602, Agent B 604 also records normal datasets to B's D.B. 612 every three seconds. Also like Agent A 602, Agent B 604 would prefer to send copies of these normal datasets to Server A 606 every five minutes (each, a "five minute dataset"). During periods when Agent B 604 is disconnected from the Internet 608, agent B stores its five minute datasets in its D.B. 612. When Agent B 604 is reconnected to Server A 606 through the Internet 608, Agent B 604 synchronizes its five minute datasets with Server A 606, providing Server A 606 with only those five minute datasets which have been created since the last synchronization.

Similarly, when Agent B 604 is disconnected from the Internet 608 and experiences an exceptional event, Agent B 604 cannot seek assistance from Agent A 602 or Server A 606. Accordingly, Agent B 604 only performs those error handling routines which it can effect while disconnected. Additionally, it stores information about the exceptional event in its D.B. 612, so that, when Agent B 604 reconnects to the Internet 608, it can forward notification of any exceptional event to Agent A 602 and Server A, along with a request for assistance, if necessary.

In this fashion, Agent B 604 can still operate, and can still detect, analyze and handle exceptional events and security violations even when not connected to any other Security Agent 404 or server 116.

4. Autonomous Error Detection.

Assume that Agent A 602 is executing as described above. As described previously, at regular intervals (e.g. every three seconds), a scheduled item within Agent A 602 initiates a query to obtain process, asset, resource and event information from the operating system 402. A ZIntrcpt 510 traps the requested resource and usage information from the operating system 402 and enters said information (the "abnormal dataset") into the Queue 508. The Qthread 502, which continually reads information within the Queue 508, reads the abnormal dataset and, detecting no exceptional events, allows the dataset to remain in its place within the Queue 508. The Security Agent 404 again removes information from the Queue 508 in a FIFO fashion. Accordingly, the abnormal dataset is eventually obtained and evaluated by Agent A 602. Agent A 602 compares the abnormal dataset with normal datasets previously stored within A's D.B. 610 and finds that the variance between the abnormal dataset and the normal datasets previously stored within A's D.B. is not within tolerance limits. Specifically, the end user 304 is attempting to access and copy significantly more sensitive documents than usual. Taken alone, each individual access would not increase the end user's 304 risk score. However, taken together, Agent A 602 is able to determine that the pattern constitutes a security risk.

Agent A 602 preferably employs a variety of techniques to further assess the rationale behind the end user's 304 frequent accesses, and will analyze and respond to the security risk as set forth previously. In this way, even when disconnected from a network, embodiments of the system can still protect against risks to sensitive information.

E. Advantages

Through the various embodiments of systems and methods of the invention, a variety of advantages are realized over security management systems previously available. These advantages include:

1. Determining a Risk Score for Each End User.

The invention generally involves evaluating the risk each end user poses to sensitive information, and calculating and updating each end user's risk score in real-time. By measuring the interactions between an end user, his or her computer, the data and documents they access, the resources they access, and reducing those measurements to granular risk metrics, a Security Agent according to the invention provides a foundation for detecting anomalous behavior within computer systems throughout an enterprise.

2. Insight into the Focal Points for Security Countermeasures.

By assessing where the vulnerable elements are within an enterprise, administrators can quickly determine where to apply security countermeasures and which countermeasures to apply. Thereafter, administrators can re-evaluate the systemwide levels of risk in order to determine whether or not the countermeasures have improved systemwide security.

3. Employee Incentivization.

By showing each end user his or her respective risk score, and updating that risk score in real-time, the invention can help individuals modify their behavior in order to lower their own risk, and therefore the entire security risk of the organization. In addition, administrators or other company representatives may even provide bonuses or benefits to employees who decrease their personal risk score. Similarly, administrators may reprimand employees whose risk score is increasing or unsatisfactory. In this way, the invention can help effect systemic behavioral change throughout an entire organization.

4. Real-Time Risk Analysis and Response.

As each Security Agent 404 expeditiously receives and responds to information regarding its end user 302, it can autonomously thwart a large disclosure or security risk posed by that end user. In the event that a normally trusted individual decides one day to steal and transmit some or all of a corporation's sensitive information, his computer system 302 will actually prevent him from doing so. The response time of the system will be significantly faster than that of systems currently available.

Various omissions, additions and modifications can be made to the methods and systems described above without departing from the spirit or scope of the invention. The description herein is illustrative, but is not limiting on the invention.

What is claimed is:

1. A method for calculating a risk score representing a risk posed by a user to information within a computer system, the method comprising:

determining, by a security agent executing on a computer within a computer system, a data risk associated with computer system information accessible by a user of the computer system;

determining, by the security agent, an application risk associated with applications executing within the computer system;

calculating, by the security agent, a risk score associated with the user using at least the data risk and the application risk;

analyzing, by the security agent, interactions between the user and the computer system to determine a risk metric for the user interactions;

re-calculating, by the security agent, the risk score using the data risk, the application risk and the determined risk metric; and displaying the risk score to the user.

2. The method of claim 1, further comprising determining a risk level representative of an amount of unsolicited email received by the user.

3. The method of claim 2, wherein calculating the risk score further comprises calculating the risk score using at least the data risk, the application risk and the risk level.

4. The method of claim 1, wherein determining the data risk further comprises determining the data risk based in part on a predetermined sensitivity value associated with the computer system information.

5. The method of claim 1, wherein determining the application risk further comprises determining the application risk based in part on a probability that interactions between the user and at least one application will corrupt at least a portion of the computer system information.

6. The method of claim 1, further comprising determining that the risk score exceeds a predetermined threshold and, responsive to the determination, restricting access to computer system information.

7. The method of claim 1, wherein re-calculating the risk score further comprises identifying that the determined risk metric is greater than a previously determined risk metric and, responsive to the identification, increasing the risk score.

8. The method of claim 1, wherein re-calculating the risk score further comprises identifying that the determined risk metric is less than a previously determined risk metric and, responsive to the identification, decreasing the risk score.

9. A system for calculating a risk score representing a risk posed by a user to information in a computer system, the system comprising:

a computer system comprising at least one computer and having information accessible by a user of the computer system; and a security agent executing on a computer within the computer system to:

determine a data risk associated with the computer system information, determine an application associated with applications executing within the computer system, calculate a risk score associated with the user, using at least the data risk and the application risk, analyze interactions between the user and the computer system to determine a risk metric for the user interactions, re-calculate the risk score using the data risk, the application risk, and the determined risk metric, and display the risk score to the user.

10. The system of claim 9, further comprising a security agent that determines a risk level representative of an amount of unsolicited email received by the user.

11. The system of claim 10, wherein the security agent calculates the risk score using at least the data risk, the application risk and the risk level.

12. The system of claim 9, wherein the security agent determines the data risk based in part on a predetermined sensitivity value associated with the computer system information.

13. The system of claim 9, wherein the security agent determines the application risk based in part on a probability that interactions between the user and at least one application will corrupt at least a portion of the computer system information.

14. The system of claim 9, wherein the security agent determines that the risk score exceeds a predetermined threshold and, responsive to the determination, restricts access to computer system information.

15. The system of claim 9, wherein the security agent re-calculates the risk score by identifying that the determined risk metric is greater than a previously determined risk metric and, responsive to the identification, increases the risk score.

16. The system of claim 9, wherein the security agent re-calculates the risk score by identifying that the determined risk metric is less than a previously determined risk metric and, responsive to the identification, decreases the risk score.

* * * * *